United States Patent [19]

Mahnke et al.

[11] 4,334,971

[45] Jun. 15, 1982

[54] MANUFACTURE OF RESILIENT FOAMS BASED ON A MELAMINE-FORMALDEHYDE CONDENSATE

[75] Inventors: Harald Mahnke; Guenter Kreibiehl, both of Ludwigshafen; Heinz Weber, Gruenstadt; Frank P. Woerner, Wachenheim, all of Fed. Rep. of Germany

[73] Assignee: BASF Aktiengesellschaft, Del.X

[21] Appl. No.: 242,561

[22] Filed: Mar. 11, 1981

[30] Foreign Application Priority Data

Mar. 27, 1980 [DE] Fed. Rep. of Germany ....... 3011769

[51] Int. Cl.$^3$ ............................................. C08G 2/02
[52] U.S. Cl. .............................. 204/159.21; 264/26; 521/136; 521/137; 521/181; 521/187; 521/188; 521/915
[58] Field of Search ..................... 521/187, 188, 915; 264/26; 204/159.21

[56] References Cited

U.S. PATENT DOCUMENTS

| | | | |
|---|---|---|---|
| 3,475,522 | 10/1969 | Garibian et al. | 264/26 |
| 3,522,196 | 7/1970 | Dorier et al. | 521/187 |
| 3,662,043 | 5/1972 | Rubeus | 264/26 |
| 3,821,337 | 6/1974 | Bunclark et al. | 264/26 |
| 4,134,942 | 1/1979 | Mirr et al. | 264/26 |
| 4,192,923 | 3/1980 | Tajkowski | 521/117 |
| 4,234,698 | 11/1980 | Inverarity et al. | 521/188 |
| 4,273,887 | 6/1981 | Wolff | 264/26 |

FOREIGN PATENT DOCUMENTS

1300107 6/1962 France .
1161338 8/1969 United Kingdom .

*Primary Examiner*—Morton Foelak
*Attorney, Agent, or Firm*—Keil & Witherspoon

[57] ABSTRACT

A process for the manufacture of a resilient foam based on a melamine-formaldehyde condensate, wherein an aqueous or alcoholic solution or dispersion containing a melamine-formaldehyde precondensate, an emulsifier, a blowing agent and a hardener is foamed by ultra-high-frequency irradiation and the foam is hardened by crosslinking the precondensate. The foam may be employed for heat and sound insulation, and as a packaging material.

4 Claims, No Drawings

MANUFACTURE OF RESILIENT FOAMS BASED ON A MELAMINE-FORMALDEHYDE CONDENSATE

The present invention relates to a process for the manufacture of a resilient foam based on a melamineformaldehyde condensate, wherein an aqueous or alcoholic solution or dispersion, which contains a melamine-formaldehyde precondensate, an emulsifier, a blowing agent and a hardener, with or without conventional additives, is foamed by ultra-high-frequency irradiation and the foam is hardened by crosslinking the precondensate.

German Laid-Open Applications DOS No. 2,915,457 and DOS No. 2,915,467 describe resilient foams based on melamineformaldehyde condensates, and processes for their manufacture. In these, a very concentrated solution or dispersion, containing a blowing agent, of a melamineformaldehyde precondensate is foamed and the foam is hardened, the foaming being effected by heating to above the boiling point of the blowing agent, in such a way that initially a slight increase in viscosity occurs and the crosslinking process, with a great increase in viscosity, essentially only takes place when the foaming process is complete. Heating is preferably effected with hot air, but can also be by steam, high frequency irradiation or the utilization of the heat of reaction.

The foams obtained have good mechanical characteristics and good sound insulation and heat insulation properties. However, using the process described it is difficult to produce foam slabs or foam sheeting having a low density (less than 8 g.l$^{-1}$) and a foam height of more than 20 cm. Foam heights of more than 60 cm are absolutely unattainable by the prior art method.

It is an object of the present invention to improve the process described, and in particular to permit the manufacture of foams of low density, namely even below 8 g.l$^{-1}$ and down to 1.6 g.l$^{-1}$, and the attainment of foam heights greater than 60 cm.

We have found that this object is achieved, according to the invention, if dielectric heating produced by ultra-high-frequency irradiation is employed.

Accordingly, the invention relates to a process for the manufacture of a resilient foam, based on a melamine-formaldehyde condensate, by foaming an aqueous or alcoholic solution or dispersion which contains a melamine-formaldehyde precondensate, an emulsifier, a blowing agent and a hardener, with or without conventional additives, and then crosslinking the precondensate, wherein, to effect foaming and crosslinking, the solution or dispersion is heated by ultra-high-frequency irradiation in such a manner that the power uptake by the solution or dispersion is from 5 to 200 KW per kg of water or alcohol in the solution or dispersion.

Using this process, there is no difficulty in producing foams, based on melamine-formaldehyde condensates, which have a density of less than 8 g.l$^{-1}$ and a foam height in excess of 60 cm.

We have found, surprisingly, that in the process according to the invention the volume of the foam is substantially greater than the gas volume of the blowing agent employed. In thermal foaming, foam formation is virtually only due to the blowing agent which is employed and which on heating forms a gas, ie. one mole of blowing agent gives at most 22.4 liters of foam under standard conditions of temperature and pressure. In the process according to the invention, surprisingly, substantially more foam, for example five times as much, is formed. This phenomenon is attributable to the fact that the ultra-high-frequency irradiation of the aqueous melamine resin solution or dispersion causes not only volatilization of the blowing agent employed, but also of water, which acts as an additional blowing agent. This effect is of great industrial importance, since in this way relatively very much less of the volatile blowing agent need be employed and volatilized and accordingly the process causes substantially less pollution of the environment than the prior art process, or substantially smaller amounts of volatilized blowing agent need be recovered.

A further advantage of the novel process is that the finished foam can be taken out of the foaming installation in a virtually dry state. Furthermore, it would be difficult, if not impossible, to emulsify, in the dispersion or solution, the large amounts of blowing agent required to achieve very low densities (less than 4 g.l$^{-1}$), and such densities are therefore only achievable through the water also acting as an essential blowing agent.

The starting material for the process according to the invention is a melamine-formaldehyde precondensate. Melamine-formaldehyde precondensates may, in addition to melamine, contain up to 50% by weight, preferably up to 20% by weight, of other thermoset resin precursors as co-condensed units, and may, in addition to formaldehyde, contain up to 50% by weight, preferably up to 20% by weight, of other aldehydes as co-condensed units, though an unmodified melamine-formaldehyde condensate is particularly preferred. Examples of additional thermoset resin precursors which may be present are alkyl-substituted melamine, urea, urethanes, carboxylic acid amides, dicyandiamide, guanidine, sulfurylamide, sulfonic acid amides, aliphatic amines, phenol and its derivatives. Examples of other aldehydes which may be employed are acetaldehyde, trimethylolacetaldehyde, acrolein, benzaldehyde, furfuraldehyde, glyoxal, phthalaldehyde and terephthalaldehyde. Further details concerning melamine-formaldehyde condensates may be found in Houben-Weyl, Methoden der organischen Chemie, Volume 14/2, 1963, pages 319–402. The thermoset resin precursor:aldehyde molar ratio may vary within wide limits, namely from 1:1.5 to 1:5; in the case of melamine-formaldehyde condensates, it is preferably from 1:2.5 to 1:3.5. The melamine resins advantageously contain co-condensed sulfite groups; there may be introduced, for example, by adding from 1 to 20% by weight of sodium bisulfite during or after the condensation of the resin. The sulfite groups make the resin more hydrophilic and hence more compatible with water. Furthermore, higher degrees of condensation are achieved.

The fineness of the foam cells can be influenced, and varied in a controlled manner, by using a suitable emulsifier, preferably in an amount of from 0.2 to 5% by weight, based on resin. This emulsifier reduces the surface tension and thereby facilitates the continuous formation of fresh surface, which is an integral part of the foaming process. If organic hydrophobic blowing agents are used, the emulsifier reduces the interfacial tension between these and the hydrophilic resin/water phase and thereby permits homogeneous emulsification of the two phases. Accordingly it stabilizes the system and prevents phase separation of the latter during foaming, which would result in an inhomogeneous foam.

The higher the foaming temperature, the more effective the emulsifier needs to be, and the higher must be the concentration in which it is used.

Suitable emulsifiers are anionic compounds, especially metal salts, preferably sodium alkylsulfonates and alkylarylsulfonates, where alkyl is of 8 to 20 carbon atoms, and also metal salts of sulfosuccinic acid esters, sulfonated castor oils, alkylnaphthalenesulfonic acids, phenolsulfonic acids and sulfuric acid esters, for example of $C_{12}$-$C_{18}$-alkyl hydrogen sulfates and $C_{16}$-$C_{18}$-fatty alcohol hydrogen sulfates.

It is also possible to use cationic compounds, such as oleic acid esters of triethanolamine, or laurylpyridinium chloride, and non-ionic compounds, such as oxyethylated castor oil, oxyethylated tallow alcohols, oxyethylated stearic acid or oleic acid, or oxyethylated nonylphenol, as well as mixtures of these.

In order to produce a foam from a pourable mixture, the latter must contain a blowing agent, the amount depending on the desired foam density. In principle, either physical or chemical blowing agents may be used in the process according to the invention. Examples of physical blowing agents are hydrocarbons, halohydrocarbons, especially fluorohydrocarbons, alcohols, ethers, ketones and esters in liquid form, or air and $CO_2$ in gaseous form. Examples of suitable chemical blowing agents are isocyanates used as a mixture with water, which liberates $CO_2$ as the effective blowing agent, as well as carbonates and bicarbonates used as a mixture with acids, which again generates $CO_2$, and azo compounds, such as azodicarboxamide. However, the principal blowing agent in the process according to the invention is the water or the alcohol present as solvents in the system. In a preferred embodiment of the invention, an auxiliary blowing agent of the type described above is admixed to the aqueous solution or dispersion, and for this purpose pentane, hexane, trichlorofluoromethane and trichlorotrifluoroethane are preferred. It is advantageous if the boiling point of the auxiliary blowing agent is substantially below that of the solvent because the sequence in which the auxiliary blowing agent and the (principal) blowing agent are volatilized is of considerable importance. Since the foam volume produced is very largely attributable to the volatilized water and only a minor proportion is due to the auxiliary blowing agent, it can be assumed that the latter serves as a nucleating agent. The total amount of blowing agent depends on the desired final density of the foam; for densities of 1.6 g.l$^{-1}$ and 30 g.l$^{-1}$ it is, respectively, about 28 moles and about 1.5 moles per kg of resin. The molar amounts in each case relate to the effective total blowing gas. In the preferred embodiment described above, from 1 to 40% by weight, based on the resin, of a physical auxiliary blowing agent having a boiling point of from 0° to 80° C. is added to the aqueous solution or dispersion; in the case of pentane, it is preferably from 5 to 15% by weight, in the case of trichlorofluoromethane from 15 to 25% by weight and in the case of trifluorotrichloroethane from 25 to 35% by weight.

The hardeners employed are compounds which, under the reaction conditions, split off or form protons, which then catalyze the further condensation of the melamine resin. The amount of hardener is from 0.01 to 20, preferably from 0.05 to 5, % by weight based on resin. Suitable hardeners are inorganic and organic acids, for example hydrochloric acid, sulfuric acid, phosphoric acid, formic acid, acetic acid, oxalic acid, lactic acid and aminoacids, as well as latent hardeners, such as halocarboxylic acid salts, chloroacetamide, hydrogen phosphates, acid anhydrides and ammonium salts. Formaldehyde itself can, at high temperatures, act as a hardener because it undergoes disproportionation, with formation of formic acid.

The aqueous or alcoholic solution or dispersion is preferably free from other additives. However, for some purposes it can be advantageous to add up to 20% by weight, though preferably less than 10% by weight, based on resin, of conventional additives, such as fibrous or pulverulent inorganic reinforcing agents or fillers, pigments, colorants, flameproofing agents, plasticizers or agents to reduce the toxicity of the combustion gases or to promote carbonization. Since the foams in general have an open cell structure and can absorb water, it may, for certain applications, be necessary to add from 0.2 to 5% by weight of hydrophobic agents. These may be, for example, alkylphenols, where alkyl is of 5 to 15 carbon atoms, silicones and paraffins.

The additives are mixed homogeneously with the aqueous solution or dispersion of the melamine resin and at the same time the auxiliary blowing agent can be forced in, if appropriate under pressure. However, it is also possible to start from a solid, for example a spray-dried, melamine resin and mix this with an aqueous solution of the emulsifier and the hardener, and with the auxiliary blowing agent, if any.

The solutions or dispersions employed in the process according to the invention can be of lower concentration than those used in the process for the manufacture of a resilient melamine-formaldehyde foam described in German Laid-Open Application DOS No. 2,915,467. The concentration of melamine-formaldehyde precondensate in the mixture of precondensate and solvent can vary within wide limits, namely from 55 to 85, preferably from 63 to 80, % by weight. The preferred viscosity of the mixture of precondensate and solvent is from 1 to 3,000 dPa.s, preferably from 5 to 2,000 dPa.s.

On foaming the solution or dispersion of the precondensate, there is first a slight rise in viscosity, during which further condensation of the precondensate occurs; the crosslinking of the condensate, with a large increase in viscosity, only starts when the foaming process is substantially complete.

When physical auxiliary blowing agents are used, the mixture is brought to the boiling point of the blowing agent in the solution or dispersion at the particular pressure; in the case of chemical blowing agents, the solution or dispersion must be heated to a temperature at which the blowing gas is liberated at an adequate rate. According to the invention, the requisite heating of the solution or dispersion is effected by ultra-high frequency irradiation. Such irradiation can in principle employ microwaves in the frequency range of from 0.2 GHz to 100 GHz. For industrial operation, frequencies of 0.915, 2.45 and 5.8 GHz are available, amongst which 2.45 GHz is particularly preferred. The source of the radiation is a magnetron, and irradiation can also be carried out with several magnetrons simultaneously. Care should be taken to ensure very uniform field strength distribution during irradiation.

The irradiation of the foamable mixture is carried out in a treatment chamber. In batchwise operation of the invention, the chamber is closed on all sides; in principle, however, continuous irradiation is also possible, with the mixture being spread uniformly on a continuously running belt and being led past the radiation source through a channel-like treatment zone, open at each end.

According to the invention, the irradiation is carried out under such conditions that the power taken up by the solution or dispersion is from 5 to 200 KW, preferably from 9 to 120 KW, per kg of water in the solution or dispersion. If the power uptake is less, foaming no longer occurs and the mixture merely hardens. Within the preferred range, the foaming of the mixture is the faster, the greater is the power uptake, but above 200 KW per kg of water the foaming rate no longer shows a substantial increase.

The power uptake cannot be measured directly, but a direct measurement of the power emitted by the irradiation source and of the power reflected by the substrate is possible. Neglecting the slight conductivity losses, the power uptake corresponds to the difference between the emitted and the reflected power. As long as there is sufficient water present in the substrate, the ratio of emitted power to reflected power is about 10:1. This ratio drops drastically when the water, which constitutes the main absorber of microwaves, has been removed, by evaporation, from the substrate. This is the point at which the irradiation should be discontinued. The foaming process in general requires from 15 seconds to 20 minutes, preferably from 25 seconds to 10 minutes. In particular, the foaming time depends on the chosen power uptake of the solution or dispersion; the lower the uptake, the longer the irradiation must be continued.

On irradiation, the substrate first comes to the boiling point of the auxiliary blowing agent at the prevailing pressure; when this blowing agent has volatilized, the temperature rises to the boiling point of water. Advantageously, the foaming is carried out under reduced pressure, preferably at 400–900 mbar.

In a preferred embodiment of the invention, the finished foam is subjected to an additional heating, namely for from 1 to 180 minutes, preferably from 3 to 60 minutes, at from 120° to 260° C., preferably from 150° to 250° C., during which water, blowing agent and formaldehyde are substantially removed and final hardening of the resin foam occurs. This heating can take place immediately after the manufacture of the foam, in the same apparatus, or in a downstream apparatus; it can however also be carried out at a later stage, independently of the foaming process. Foams which have been heated in this way show substantially less tendency to shrink and have a lower equilibrium moisture content than products which have not been heated. The emission of formaldehyde is also greatly reduced. The heating can be carried out either thermally or by irradiation with microwaves of frequency 2.45 GHz.

In a further preferred embodiment of the invention, the foam, before or after the optional heat treatment, is compressed once or several times by from 40 to 90% of its original height, and is then allowed to recover. This milling process presumably destroys residual hard zones in the cellular structure. This leads to an increase in the resilience of the foam and to less shrinkage on storage under warm conditions.

The foams manufactured according to the invention are distinguished by the following properties:

(a) their overall density, measured according to DIN 53,420, is from 1.6 to 30, preferably from 2 to 20 $[g.l^{-1}]$;

(b) their heat conductivity, measured according to DIN 52,612, is less than 0.06, preferably less than 0.04 $[W.m^{-1}.°K.^{-1}]$;

(c) their compressive strength, measured according to DIN 53,577, at 60% compression, divided by the overall density, is less than 0.3, preferably less than 0.2 $[N.cm^{-2}/g.l^{-1}]$, a condition of the determination of the compressive strength at 60% compression being that the foam subsequently recovers to not less than 70%, preferably not less than 90%, and in particular 95%, of its original thickness;

(d) the modulus of elasticity, measured by a method similar to DIN 53,423, divided by the overall density, is less than 0.25, preferably less than 0.15 $[N.mm^{-2}/g.l^{-1}]$;

(e) the deflection at rupture, measured according to DIN 53,423, is greater than 10, preferably greater than 15 [mm];

(f) the permanent set, measured according to DIN 53,572 at 50% compression, is less than 45%, preferably less than 30% and in particular less than 10%;

(g) the dynamic rigidity, measured according to DIN 18,165 at a sheet thickness of 50 mm, is less than 20, preferably less than 10 and in particular less than 5 $[N.cm^{-3}]$;

(h) the foams are of not more than normal flammability, preferably of low flammability, measured according to DIN No. 4,102.

The foams can be manufactured in the form of panels, blocks or sheeting, with thicknesses of up to 2 m, or as thin sheets of foam, having a thickness of a few mm. The preferred foam thickness (in the foam rise direction), when using microwaves of frequency 2.45 GHz, is from 60 cm to 150 cm. Any desired thicknesses of panel or sheet can be cut from such foam blocks. The foams can be provided, or laminated, with covering layers on one or both sides, for example with paper, cardboard, fiber glass web, wood, plasterboard, metal sheet or film or plastic film which may also be foamed.

The main field of use of the foams manufactured according to the invention is in the heat insulation and sound insulation of buildings and of building components, in particular partitions, but also roofs, facades, doors and floors, as well as the heat insulation and sound insulation of vehicles and aircraft, and low-temperature insulation, for example refrigerated warehouses, oil tanks and liquefied gas containers. Other fields of use are as insulating wall cladding and as insulating and shock-absorbing packaging material.

In the Examples, parts, percentages and ratios are by weight.

EXAMPLE 1

A spray-dried melamine-formaldehyde precondensate (molar ratio 1:3, molecular weight about 400) was added, in an open vessel, to an aqueous solution containing 3% of formic acid and 2% of sodium dodecylbenzenesulfonate, the percentages being based on melamine resin. The concentration of the resin, based on the mixture of resin and water, was 74.0% and the viscosity 230 dPa.s. The mixture was stirred vigorously and 33% of trichlorotrifluoroethane were then added. Stirring was continued (for about 3 minutes) until a homogeneous dispersion was formed. Part of this dispersion was applied to a polyethylene sheet and placed on the bottom of the treatment chamber, which consisted of a 1 m high polypropylene cylinder, having a diameter of 35 cm and internally lined with a foam polystyrene sheet. The treatment chamber was irradiated from above and below, using a magnetron as the source of ultra-high-frequency irradiation. The frequency was 2.45 GHz and the power taken up by the mixture was 110 KW per kg of water. The mold release time, ie. the time required for foaming and hardening, was about 60 sec.

The freshly prepared, 1 m high foam was then heated at about 230° C. for 20 minutes. Thereafter the foam block was cut into 10 cm thick panels, which were repeatedly milled by compression to about 70% of their original thickness.

The properties of the products are shown in the Table.

TABLE

| | |
|---|---|
| Overall density: | 4 [g.l$^{-1}$] |
| Heat conductivity: | 0.04 [W.m$^{-1}$.°K$^{-1}$] |
| Compressive strength: | 0.18 [N.cm$^{-2}$] |
| Recovery: | 95% |
| Modulus of elasticity: | 0.6 [N.mm$^{-2}$] |
| Deflection at break: | 20 mm |
| Permanent set: | 6% |
| Dynamic rigidity: | 1.3 [N.cm$^{-3}$] |
| Building material category: | B 1 (low flammability) |

EXAMPLE 2

A 71% strength aqueous solution of a melamine-formaldehyde precondensate (molar ratio 1:2, modified with 6% of sodium bisulfite), having a viscosity of 50 Pa.s, together with 1% of sodium $C_{12}$–$C_{18}$-alkylsulfonate, 1% of an emulsifier consisting of a sulfated tallow alcohol modified with 100 moles of ethylene oxide per mole of alcohol, 1.8% of formic acid and 20% of trichlorotrifluoroethane (the percentages being based on solid resin) were emulsified in an open vessel by means of a high-speed stirrer. At part of the homogeneous emulsion was applied to the bottom of a treatment chamber of size 80×80×80 cm, the walls of which consisted of glass mat-reinforced polyester, of 10 mm thickness. The treatment chamber was irradiated from above and below, using a magnetron of frequency 2.45 GHz. The power taken up by the mixture was 75 KW per kg of water. The time for foaming and hardening was about 2 minutes.

Immediately thereafter, the material was heated, whilst exposed to the same radiation energy density, for 5 minutes. During this, the power uptake was increased continuously at the rate at which water escaped from the foam. Immediately after removal from the chamber, the freshly produced foam showed 3.5% linear shrinkage and was absolutely dry.

In air, it gradually took up moisture, up to an equilibrium content of 5% by weight. This was accompanied by slight swelling, so that the total shrinkage was 3.0%. The final foam block, which was 80 cm thick and had a density of 4.5 g.l$^{-1}$, was then cut into 10 cm thick panels.

We claim:

1. A process for the manufacture of a resilient foam, based on a melamine-formaldehyde condensate, by foaming an aqueous or alcoholic solution or dispersion which contains a melamine-formaldehyde precondensate, an emulsifier, a blowing agent and a hardener, with or without conventional additives, and then crosslinking the precondensate, wherein, to effect foaming and crosslinking, the solution or dispersion is heated by ultra-high-frequency irradiation in the form of microwaves in the frequency range of from 0.2 GHz to 100 GHz in such a manner that the power uptake of the solution or dispersion is from 5 to 200 KW per kg of water or alcohol in the solution or dispersion.

2. A process as set forth in claim 1, wherein the foam is heated for from 1 to 180 minutes at from 120° to 260° C., during which water, blowing agent and formaldehyde are substantially removed and further hardening takes place.

3. A process as set forth in claim 1, wherein, before or after the heat treatment according to claim 2, the foam is compressed once or several times by from 40 to 90% of its original height and allowed to recover.

4. A process as set forth in claim 1, wherein the solution or dispersion is heated by microwaves in the frequency range of from 0.915 GHz to 5.8 GHz.

* * * * *